United States Patent
Uchiyama

(10) Patent No.: US 7,019,232 B2
(45) Date of Patent: Mar. 28, 2006

(54) OPERATION LEVER STRUCTURE OF LEVER SWITCH

(75) Inventor: Norio Uchiyama, Tokyo (JP)

(73) Assignee: Niles Co., Ltd. (JP)

( * ) Notice: Subject to any disclaimer, the term of this patent is extended or adjusted under 35 U.S.C. 154(b) by 64 days.

(21) Appl. No.: 10/756,400

(22) Filed: Jan. 14, 2004

(65) Prior Publication Data

US 2004/0149554 A1 Aug. 5, 2004

(30) Foreign Application Priority Data

Jan. 30, 2003 (JP) .................................... P2003-021737

(51) Int. Cl.
*H01H 9/00* (2006.01)

(52) U.S. Cl. .................................. 200/61.54; 200/17 R
(58) Field of Classification Search ............. 200/61.54, 200/17 R, 61.27, 61.3, 61.28, 4, 61.38, 43.16
See application file for complete search history.

(56) References Cited

U.S. PATENT DOCUMENTS

| | | | | |
|---|---|---|---|---|
| 5,272,290 A | * | 12/1993 | Suzuki et al. ................... 200/4 |
| 5,670,765 A | * | 9/1997 | Yokoyama et al. ....... 200/61.54 |
| 5,736,700 A | * | 4/1998 | Takahashi et al. ....... 200/61.54 |
| 5,804,784 A | * | 9/1998 | Uchiyama et al. ....... 200/61.54 |
| 5,967,300 A | * | 10/1999 | Hecht et al. ................. 200/512 |
| 5,977,494 A | * | 11/1999 | Sano et al. ............... 200/61.54 |
| 6,670,564 B1 | * | 12/2003 | Naito et al. .............. 200/61.54 |
| 6,781,072 B1 | * | 8/2004 | Uchiyama et al. ....... 200/61.54 |
| 6,791,042 B1 | * | 9/2004 | Nakade et al. ................. 200/61 |

FOREIGN PATENT DOCUMENTS

| EP | 577499 | * | 6/1993 |
|---|---|---|---|
| GB | 2272330 | * | 11/1993 |
| JP | 2000-195380 | | 7/2000 |
| JP | 2000-322982 | | 11/2000 |

* cited by examiner

*Primary Examiner*—Elvin Enad
*Assistant Examiner*—Lisa Klaus
(74) *Attorney, Agent, or Firm*—Rader, Fishman & Grauer PLLC

(57) ABSTRACT

An operation lever structure of a lever switch for a vehicle has a knob, a lever guide inserted inside the knob, and a pair of guide ribs formed in an outer surface of the lever guide. A pair of guide ribs are formed projecting from and integrating with the knob at a position opposed to the pair of the guide ribs of the lever guide and extend to the outer surface of the lever guide between the pair of the guide ribs of the lever guide, wherein harnesses are inserted between the pair of the guide ribs of the knob. Thereby, sandwich of the harnesses on assembly is prevented.

4 Claims, 9 Drawing Sheets

OPERATION LEVER STRUCTURE OF LEVER SWITCH

BACKGROUND OF THE INVENTION

1. Field of The Invention

The present invention relates to an operation lever structure of a lever switch and particularly to an operation lever structure of a combination switch for an automobile.

2. Background Information

Japanese Unexamined Patent Publications No. 2000-322982 and No. 2000-195380 disclose an operation lever structure of a lever switch for a vehicle, for example, a combination switch for an automobile as the related art as shown in FIG. 5–FIG. 9.

An operation lever 1, as shown in FIG. 5–FIG. 9, is equipped with a substantially cylindrical knob 2, a substantially cylindrical lever guide 3 inserted into the knob 2, a pair of rotation knobs 5, 6 rotatably supported through a stationary knob 4 in a tip of the lever guide 3, and harnesses 7 inserted between an inner surface 2a of the knob 2 and an outer surface 3a of the lever guide 3.

As shown in FIG. 6 and FIG. 7, ribs 3b are formed integrating with and projecting from the outer surface 3a of the lever guide 3 at an upper and center part, and both of a left hand side and a right hand side in the outer surface 3a thereof where the ribs 3b extend to the inner surface 2a of the knob 2, as well as a pair of guide ribs 3c, 3c are formed projecting from and integrating with a lower part of the outer surface 3a of the lever guide 3 where the pair of the guide ribs 3c, 3c extend to the inner surface 2a of the knob 2. Harnesses 7 are inserted in a space defined by the outer surface 3a of the lever guide 3, the pair of the guide ribs 3c, 3c, and the inner surface 2a of the knob 2.

A connector 8 secured to an end of the harnesses 7 is connected to a terminal (not shown) in a side of the rotation knob 6 and another end of the harnesses 7 is connected to a combination switch 9 and the like.

However, a base of the lever guide 3 is mounted to a combination switch 9, thereby to carry out a switching connection with various functions based upon operating the knob 2 into which the lever guide 3 is inserted, in the right and left directions, as well as the upward and downward directions.

SUMMARY OF THE INVENTION

However, in the above-mentioned operation lever 1 as the related art, when the operation lever 1 is assembled, the lever guide 3 is inserted into the knob 2 after the harnesses 7 are inserted inside the knob 2 as shown in FIG. 5. Accordingly, when the lever guide 3 is inserted inside the knob 2, the harnesses 7 are possibly separated inside the inner surface 2a of the knob 2. On this occasion, as shown in FIG. 7, the harnesses 7 are sandwiched between the guide ribs 3c of the lever guide 3 and the inner surface 2a of the knob 2, thereby to be possibly damaged, which leads to deterioration of assembling performance.

In view of the above, there exists a need for an operation lever structure of a lever switch to overcome the above-mentioned problems. This invention addresses this need as well as other needs, which will become apparent to those skilled in the art from this disclosure.

An aspect of the present invention provides an operation lever structure of a lever switch, which can obtain good assembling performance.

An aspect of the present invention is basically attained by providing an operation lever structure of a lever switch comprising:

a substantially cylindrical knob;

a lever guide inserted into the knob, and a plurality of first guide ribs disposed in an outer surface of the lever guide, the plurality of the first guide ribs extending toward an inner surface of the knob, wherein a harness is inserted between the plurality of the first guide ribs, the operation lever structure comprising:

a pair of second guide ribs disposed in the knob at a position inside the inner surface thereof opposed to the plurality of the first guide ribs, the pair of the second guide ribs of the knob extending toward the outer surface of the lever guide between the plurality of the first guide ribs, wherein the harness is inserted between the pair of the second guide ribs of the knob.

These and other objects, features, aspects and advantages of the present invention will become apparent to those skilled in the art from the following detailed description, which discloses a preferred embodiment of the present invention, taken in conjunction with the annexed drawings.

BRIEF EXPLANATION OF THE DRAWINGS

Referring now to the attached drawings which form a part of this original disclosure:

FIG. 7 is a side elevation view in the same way with FIG. 6 illustrating a state where a harness of the operation lever as the related art is caught in;

DETAILED DESCRIPTION OF THE PREFERRED EMBODIMENT

A selected embodiment of the present invention will be now explained with reference to the drawings. It will be apparent to those skilled in the art from this disclosure that the following description of the embodiment of the present invention is provided for illustration only, and not for the purpose of limiting the invention as defined by the appended claims and their equivalents.

Figure 1:
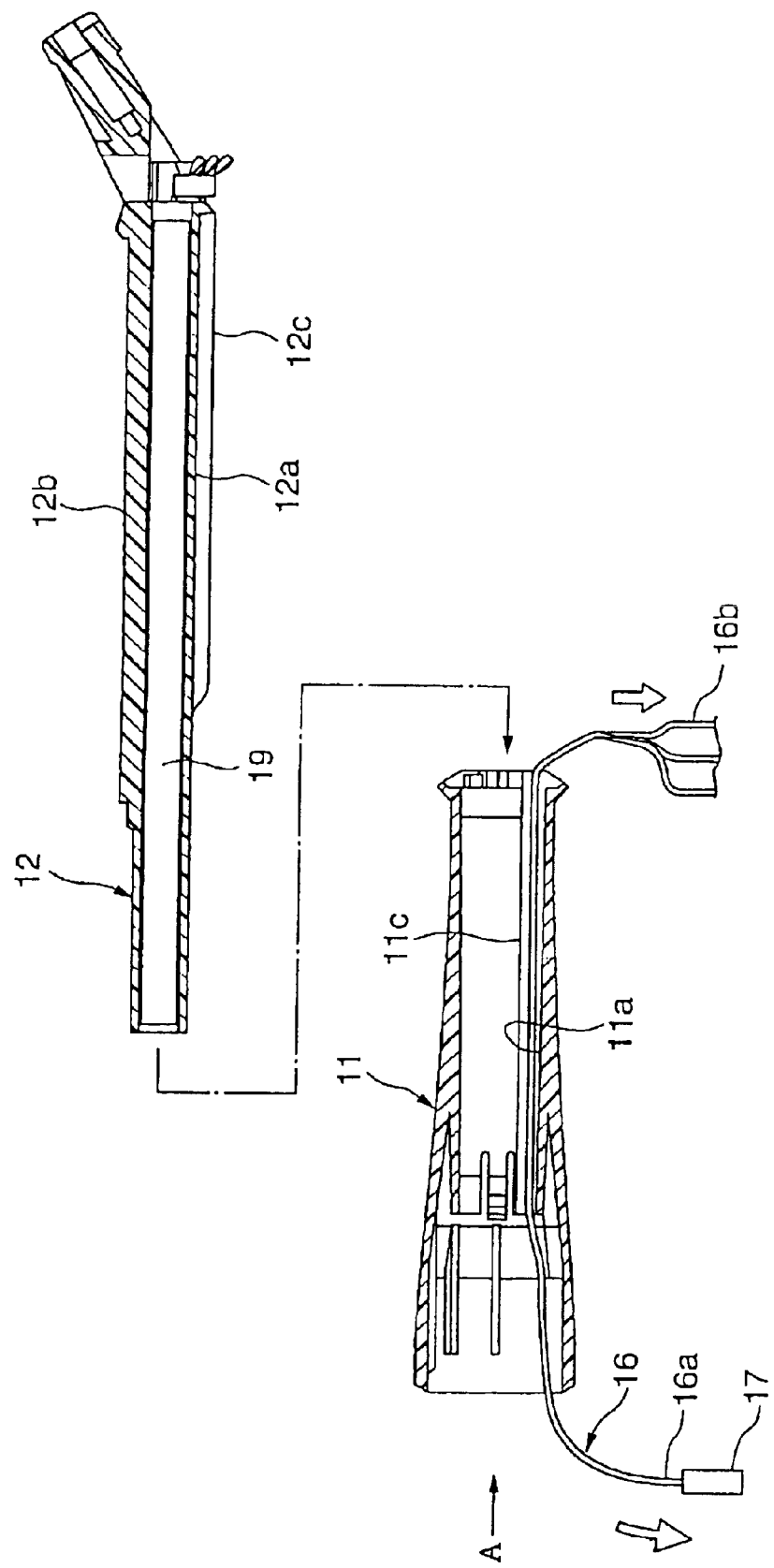
FIG. 1 is a cross sectional view illustrating a state of an operation lever of a combination switch for a vehicle prior to assembly thereof according to an embodiment of the invention.

FIG. 1 is a cross sectional view illustrating a state of an operation lever of a combination switch for a vehicle prior to assembly thereof according to an embodiment of the invention.

Figure 2:
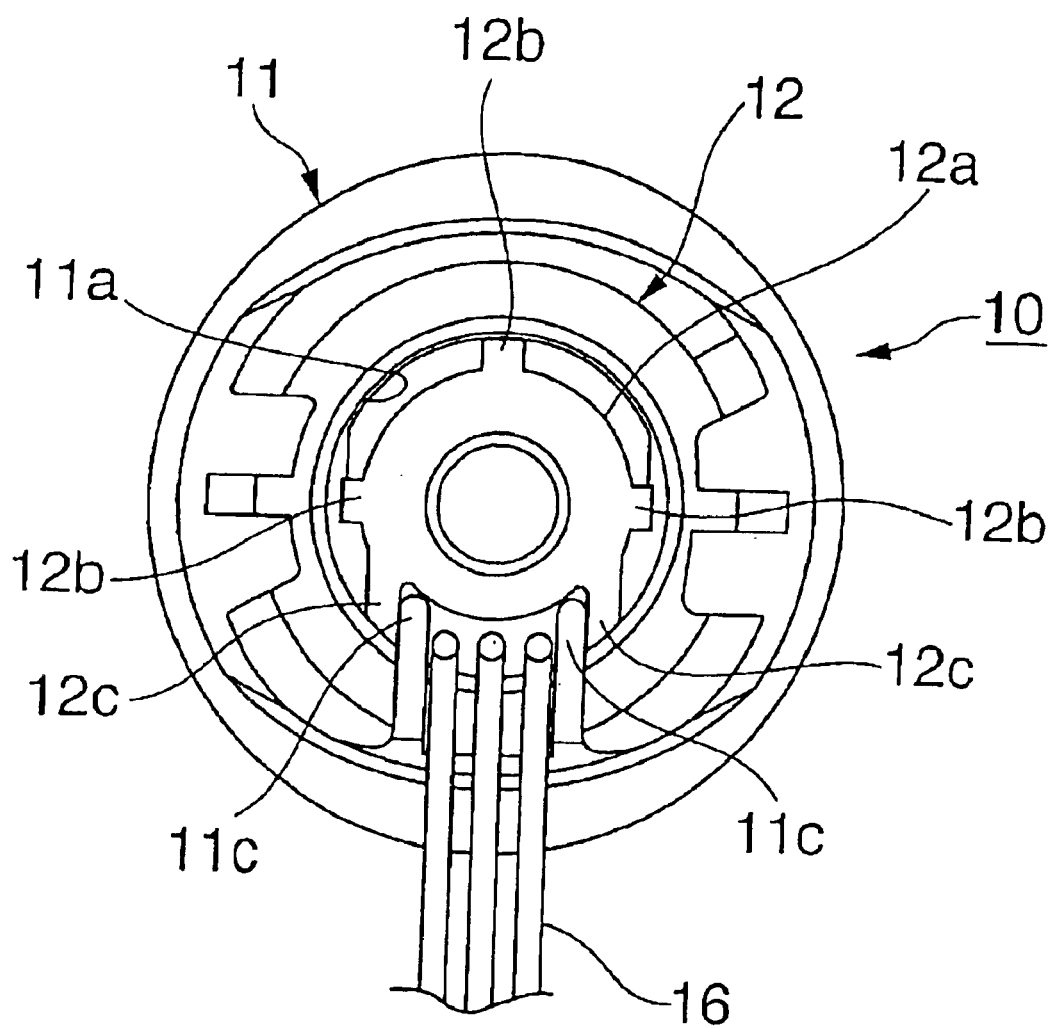
FIG. 2 is a side elevation view from the direction of an arrow A showing a portion of the operation lever after assembly thereof.
Figure 3:
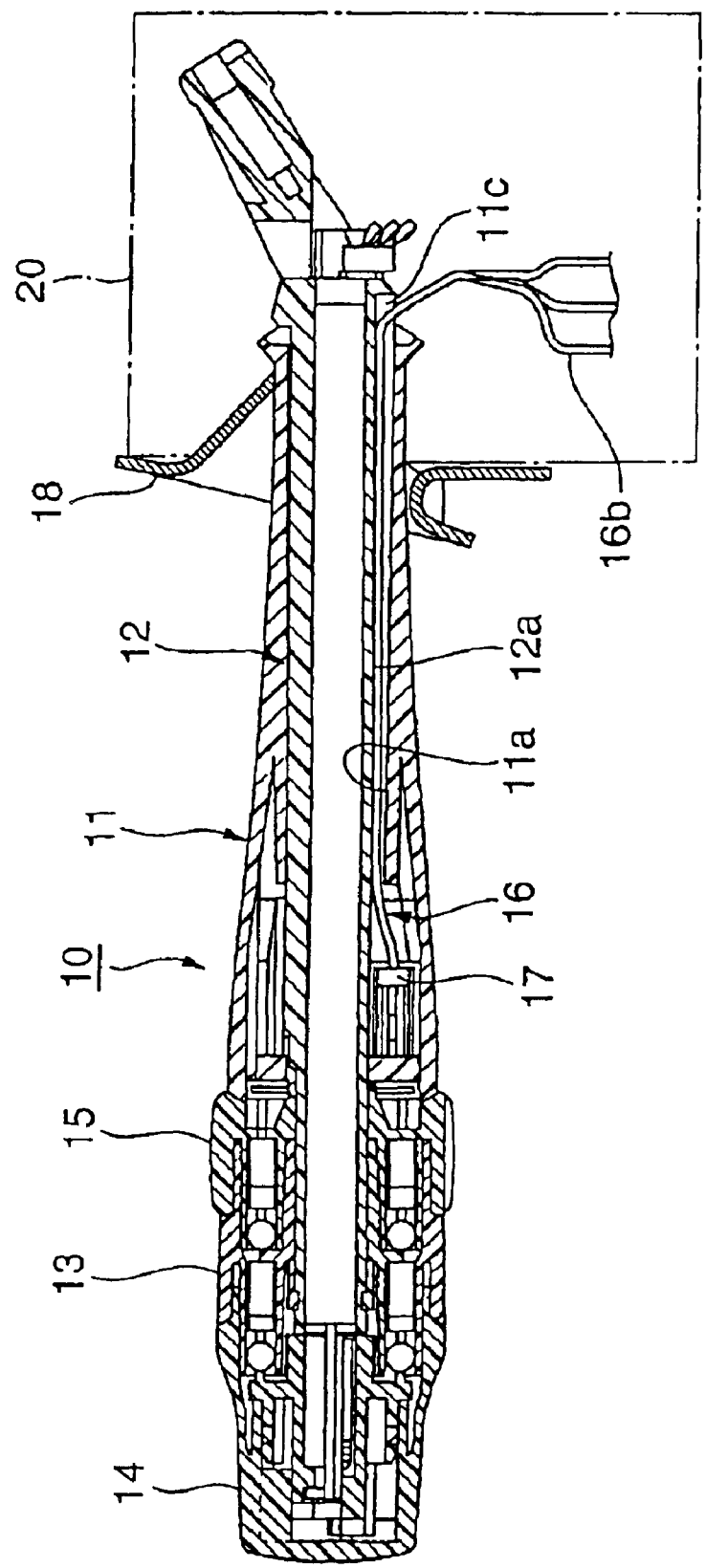
FIG. 3 is a cross sectional view of the operation lever.
Figure 4:
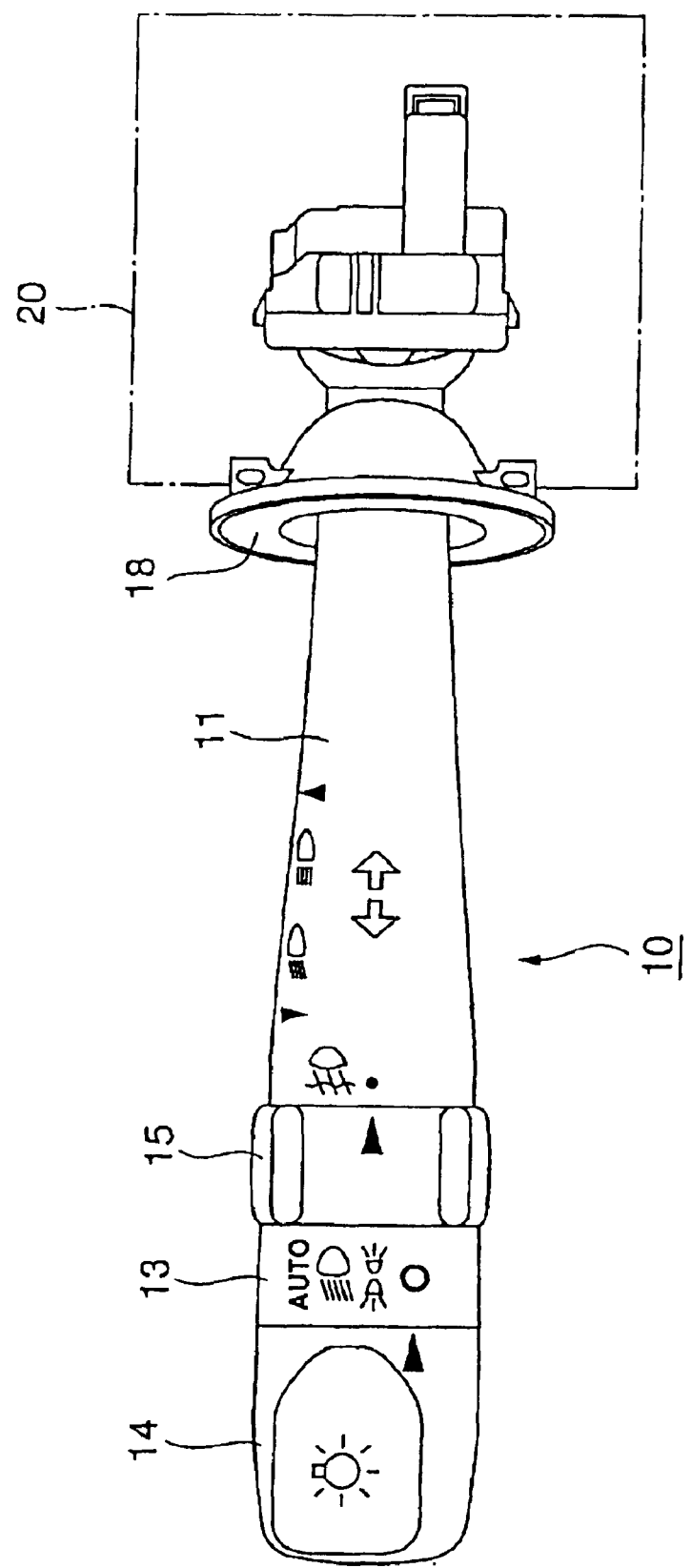
FIG. 4 is a plan view of the operation lever.
Figure 5:
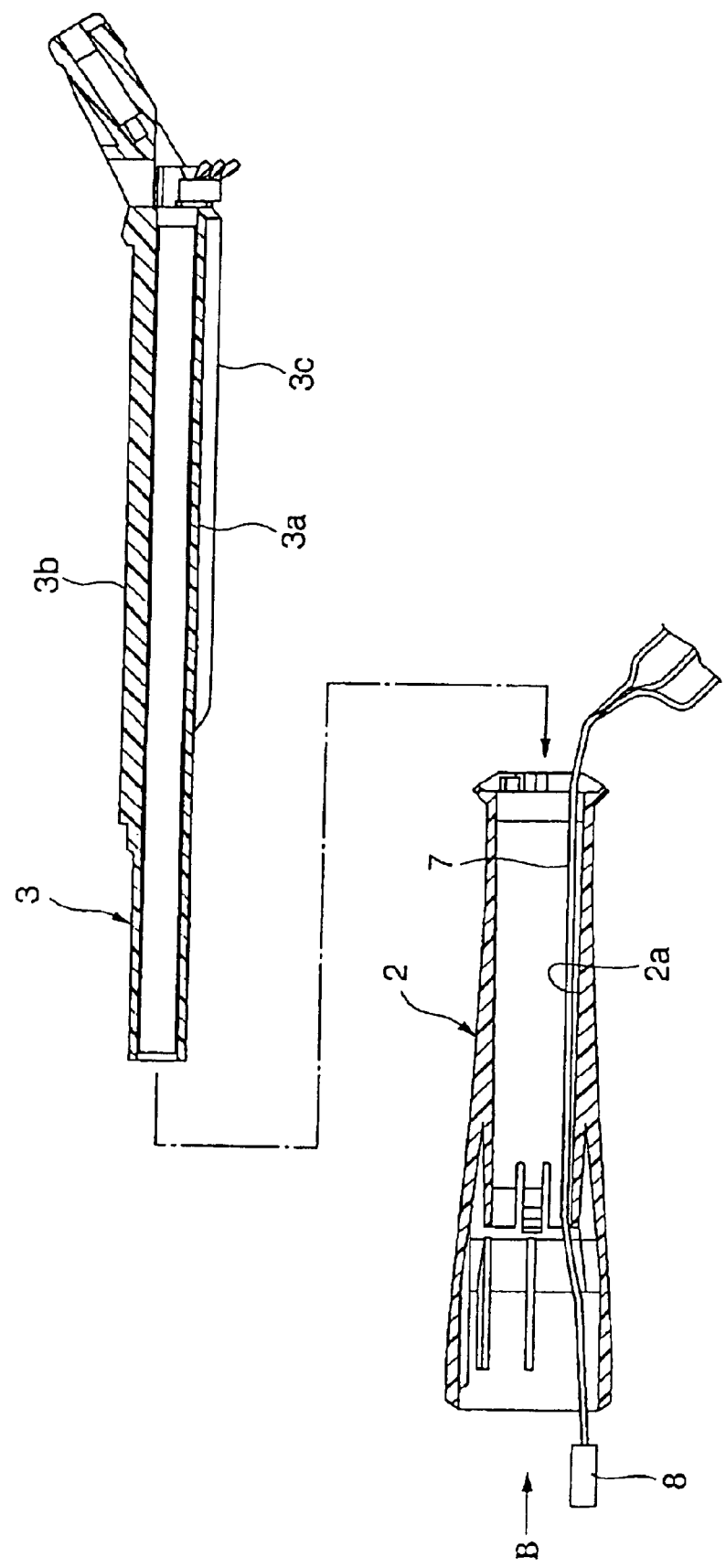
FIG. 5 is a cross sectional view illustrating a state of an operation lever of a combination switch for a vehicle as the related art.
Figure 6:
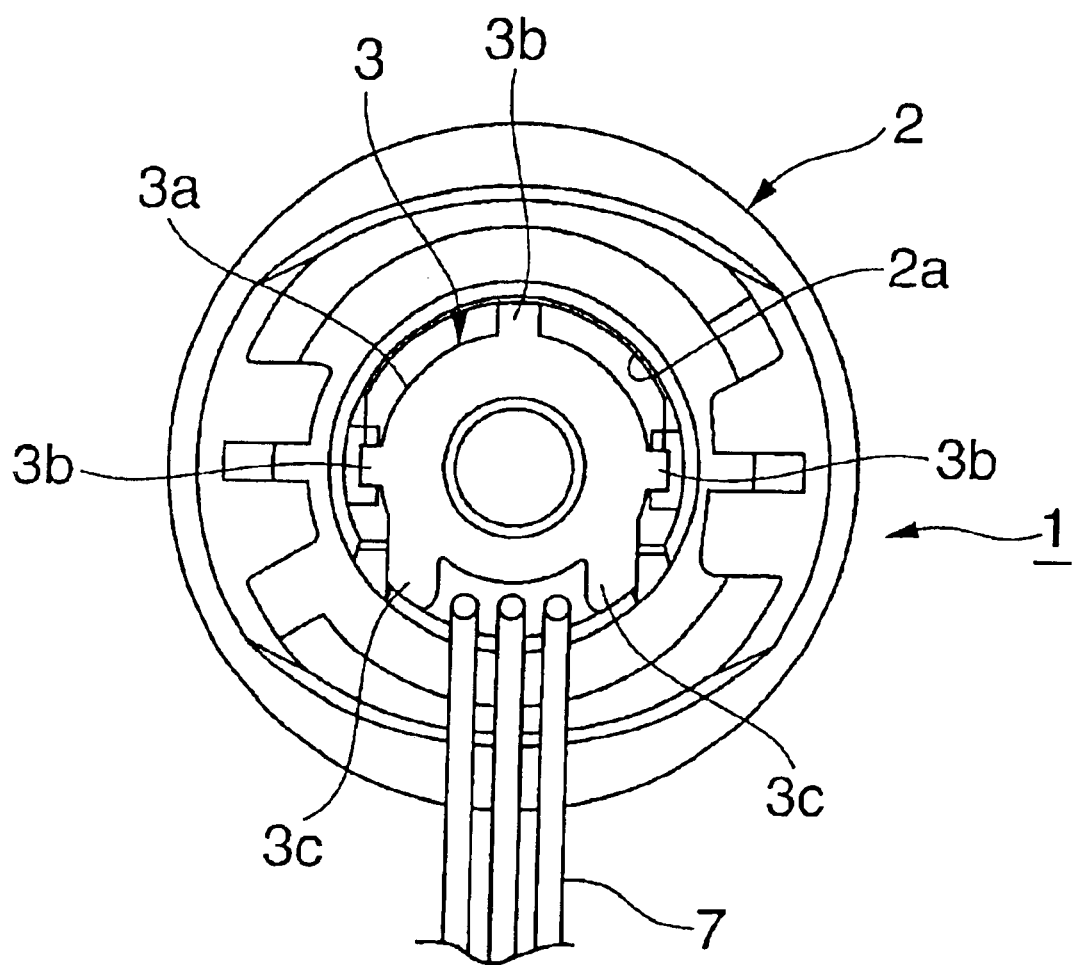
FIG. 6 is a side elevation view from the direction of an arrow B showing a portion of the operation lever as the relate art after assembly thereof.
Figure 7:
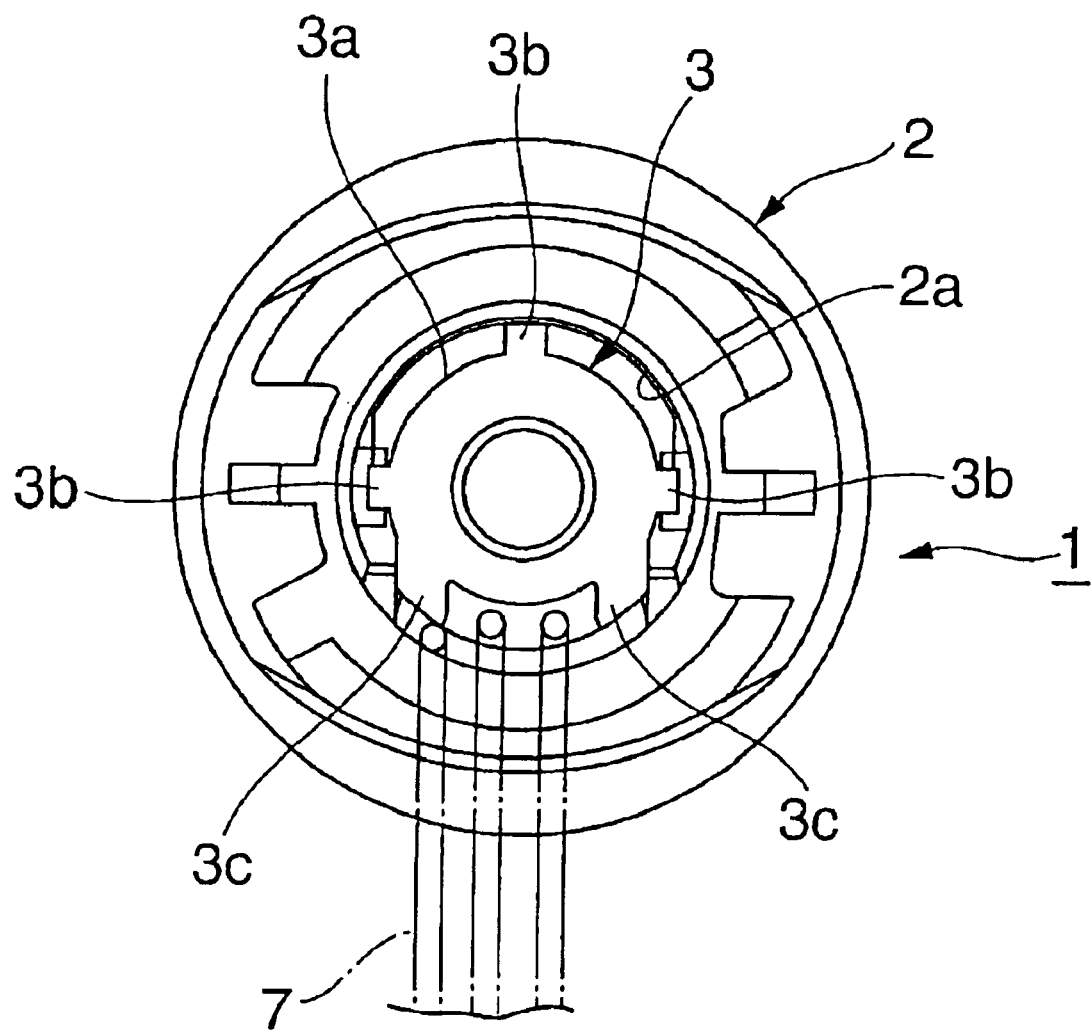
Figure 8:
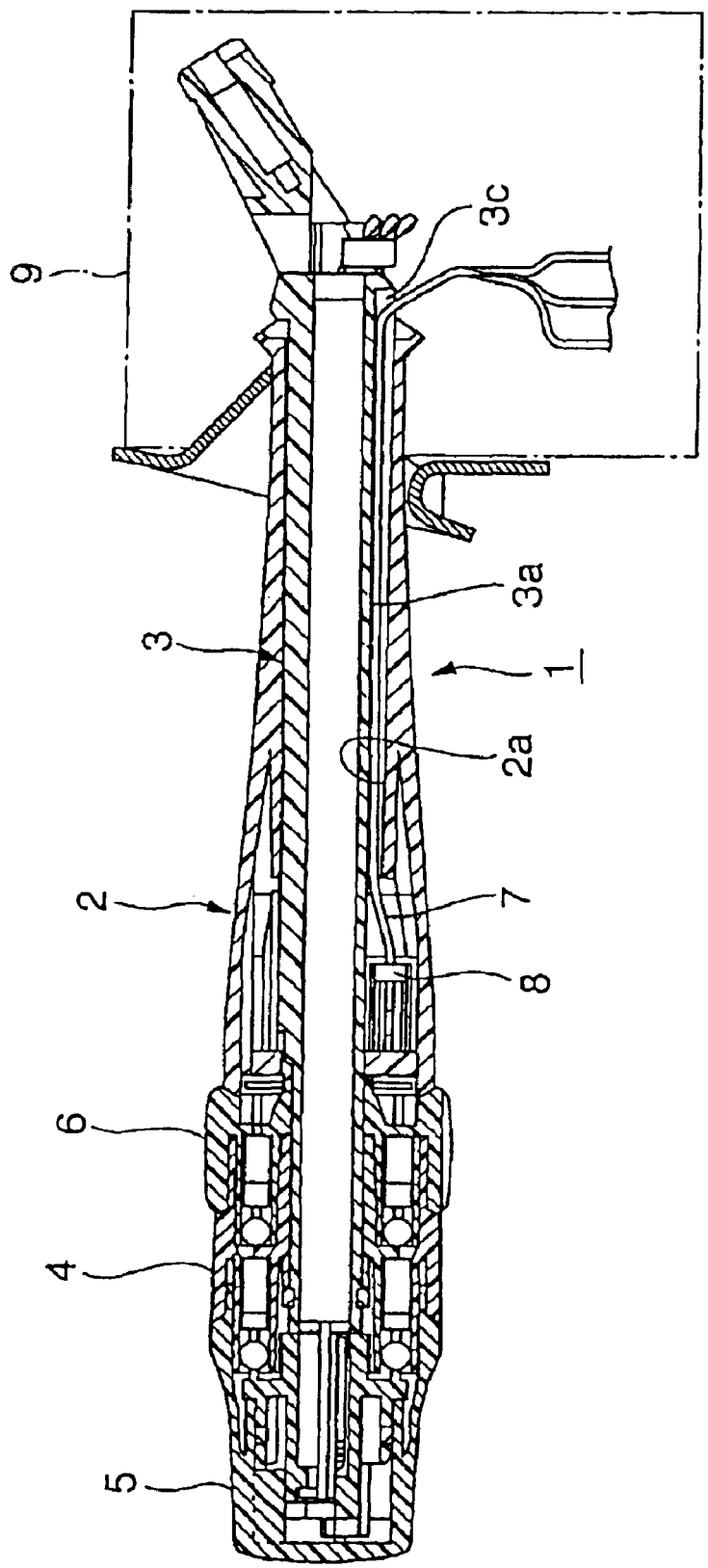
FIG. 8 is a cross sectional view of the operation lever as the related art.
Figure 9:
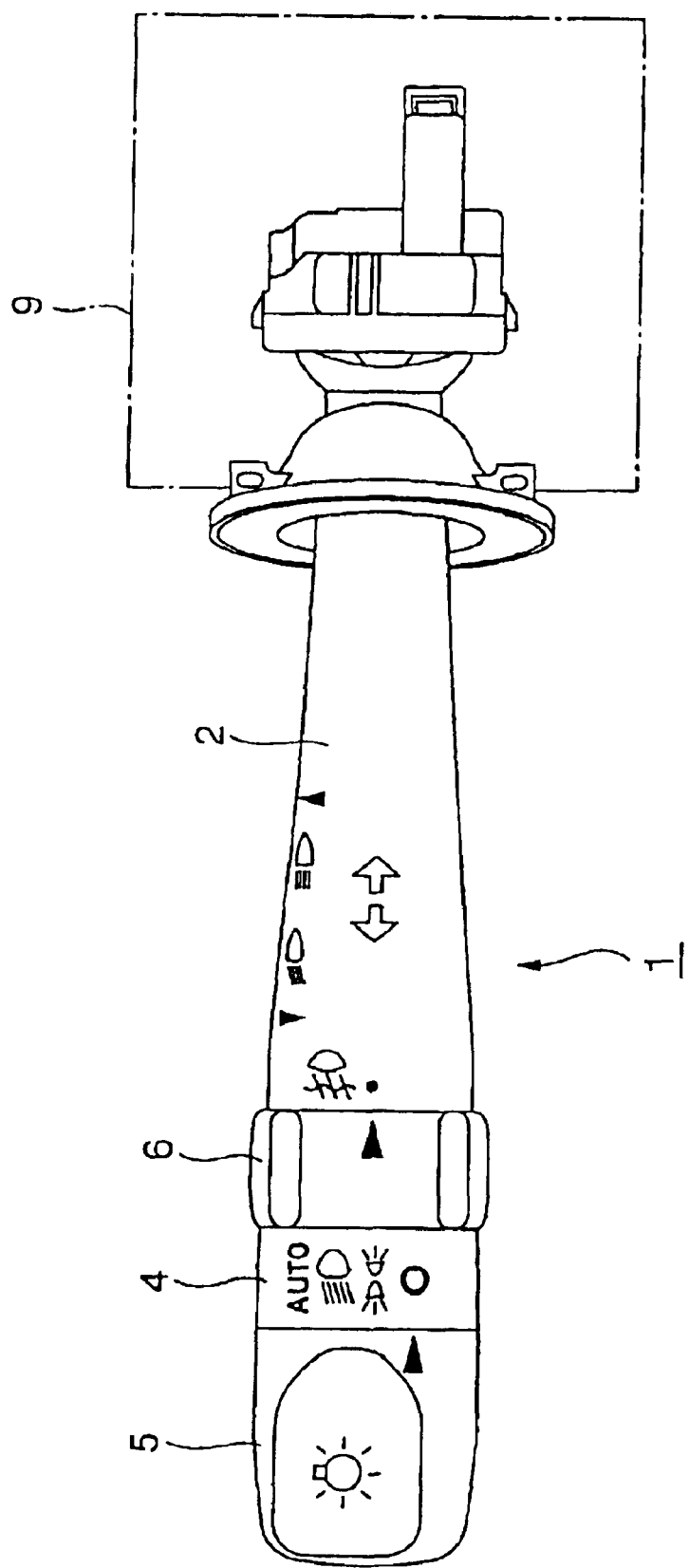
FIG. 9 is a plan view of the operation lever as the related art.

FIG. 2 is a side elevation view from the direction of an arrow A showing a portion of the operation lever after assembly thereof. FIG. 3 is a cross sectional view of the operation lever. FIG. 4 is a plan view of the operation lever.

As shown in FIG. 3 and FIG. 4, an operation lever 10 is used as a lever switch for a vehicle, for example, a combination switch for an automobile comprises a substantially cylindrical knob 11 made of synthetic resin, a substantially cylindrical lever guide 12 made of synthetic resin inserted into the knob 11, a pair of rotation knobs 14, 15 made of synthetic resin rotatably supported through a stationary knob 13 made of synthetic resin in a tip of the lever guide 12, a shaft 19 that rotates inside the lever guide 12, thereby to transmit rotation of the rotation knob 14 to a switch unit 20, and a plurality of harnesses 16 inserted between an inner surface 11a of the knob 11 and an outer surface 12a of the lever guide 12.

As shown in FIG. 1 and FIG. 2, ribs 12b are formed projecting from and integrating with the outer surface 12a of the lever guide 12 at an upper and center part, and both of a left hand side and a right hand side in the outer surface 12a thereof where the ribs 12b extend to the inner surface 11a of the knob 11, as well as a pair of guide ribs 12c, 12c are formed projecting from and integrating with a lower part of the outer surface 12a where the pair of the guide ribs 12c, 12c extend to the inner surface 11a of the knob 11.

A pair of guide ribs 11c, 11c are formed integrating with and projecting from the knob 11 at a location inside the inner surface 11a thereof opposed to the pair of the guide ribs 12c, 12c of the lever guide 12 where the pair of the guide ribs 11c, 11c extend to the outer surface 12a of the lever guide 12 between the pair of the guide ribs 12c, 12c. That is, the pair of the guide ribs 11c, 11c of the knob 11 are adapted to be fitted inside the pair of the guide ribs 12c, 12c of the lever guide 12.

As shown in FIG. 2 and FIG. 3, harnesses 16 penetrate through a space defined by the outer surface 12a of the lever guide 12, the inner surface 11a of the knob 11, and the pair of the guide ribs 11c, 11c of the knob 11. A connector 17 secured to an end 16a of the harnesses 16 is connected to a terminal (not shown) disposed in a side of the rotation knob 15. Another end 16b of the harnesses 16 is connected to a combination switch 20 and the like.

However, a base of the lever guide 12 is mounted to the combination switch 20 through a bell mouth of a boot 18 wherein a switching connection of a switch equipped with various functions is performed by operating the knob 11 into which the lever guide 12 is inserted, in the right and left directions, and the upward and downward directions.

According to the operation lever structure of the combination switch 20 of the embodiment as mentioned above, when the operation lever 10 is assembled, as shown in FIG. 1, the harnesses 16 are inserted between the pair of the guide ribs 11c, 11c of the knob 11 and then the lever guide 12 is inserted and assembled therein, pulling downward the both ends 16a, 16b of the harnesses 16 as shown by an arrow in FIG. 1. At this moment, the harnesses 16 are assembled without being separated between the pair of the guide ribs 11c, 11c, and the inner surface 11a of the knob 11.

As mentioned above, since the pair of the guide ribs 11c, 11c are formed integrating with and projecting from the knob 11 at the location opposed to the pair of the guide ribs 12c, 12c of the lever guide 12 where the pair of the guide ribs 11c, 11c of the knob extend to the outer surface 12a of the lever guide 12 between the pair of the guide ribs 12c, 12c, and the harnesses 16 penetrate through a space defined by the outer surface 12a of the lever guide 12, the inner surface 11a of the knob 11, and the pair of the guide ribs 11c, 11c of the knob 11, sandwiching the harnesses 16 between the inner surface 11a of the knob 11 and each of the guide ribs 12c, 12c is surely prevented, as well as a damage of the harnesses 16 caused by the sandwich thereof is prevented. Thereby the operation lever 10 with high quality can be manufactured at a low cost.

Since the pair of the guide ribs 11c, 11c of the knob 11 serve as an identification of the location place of the harnesses 16 on assembling the operation lever 10, assembling performance of the operation lever 10 greatly improves.

Further, since the pair of the guide ribs 11c, 11c of the knob 11 are inserted and fitted inside the pair of the guide ribs 12c, 12c of the lever guide 12, movement of the knob 11 relative to the lever guide 12 is prevented properly.

Further, according to the above-mentioned embodiment, a combination switch for an automobile as a lever switch for a vehicle is explained but the embodiment may be applied to a lever switch other than a combination switch for an automobile.

This application claims priority to Japanese Patent Application No. 2003-021737. The entire disclosure of Japanese Patent Application No. 2003-021737 is hereby incorporated herein by reference.

While only the selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. An operation lever structure of a lever switch comprising:
   a substantially cylindrical knob;
   a lever guide inserted into the knob;
   a harness inserted between an inner surface of the knob and an outer surface of the lever guide; and
   a plurality of first guide ribs disposed in the outer surface of the lever guide, the first guide ribs extending toward the inner surface of the knob, wherein the harness is inserted between the first guide ribs, the operation lever structure comprising:
      a pair of second guide ribs disposed in the knob at a position inside the inner surface of the knob opposed to the first guide ribs, the second guide ribs extending toward the outer surface of the lever guide between the first guide ribs, wherein the harness is inserted between the second guide ribs.

2. An operation lever structure of a lever switch comprising:
   a substantially cylindrical knob;
   a lever guide inserted into the knob;
   a harness inserted between an inner surface of the knob and an outer surface of the lever guide; and
   a pair of first guide ribs disposed in the outer surface of the lever guide, the first guide ribs extending to the inner surface of the knob, wherein the harness is inserted between the first guide ribs, the operation lever structure comprising:
      a pair of second guide ribs disposed in the knob at a position inside the inner surface of the knob opposed to the first guide ribs, the second guide ribs extending to the outer surface of the lever guide between the first guide ribs, wherein the harness is inserted between the second guide ribs.

3. An operation lever structure as defined in claim 2, wherein the second guide ribs are inserted and fitted into an inside of the first guide ribs.

4. An operation lever structure as defined in claim 3, wherein the operation lever structure of the lever switch is used for a combination switch for an automobile.

* * * * *